W. P. & S. G. THOMSON.
RAIL JOINT.
APPLICATION FILED FEB. 17, 1911.
1,016,797.
Patented Feb. 6, 1912.
2 SHEETS—SHEET 1.
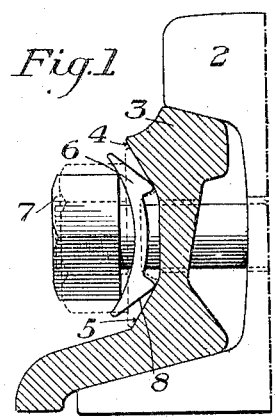
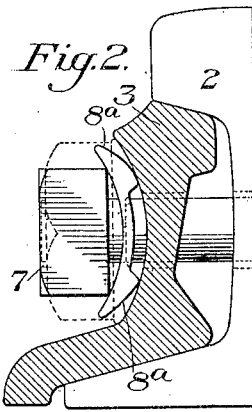
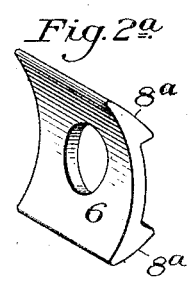
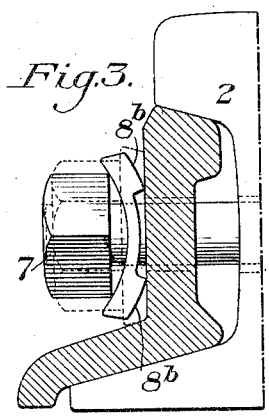
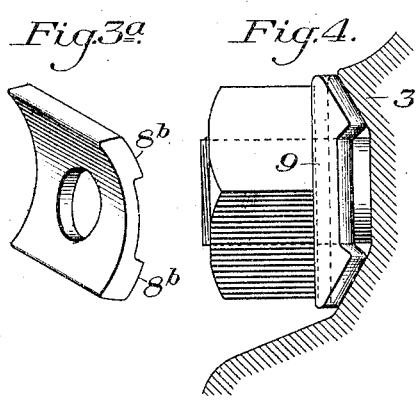
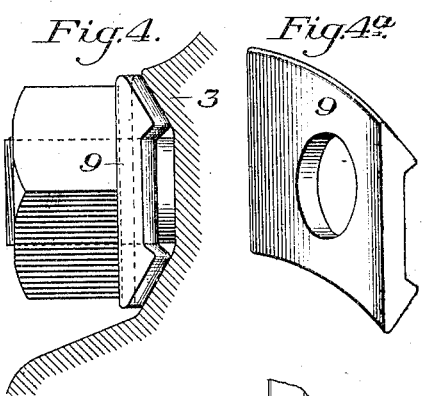
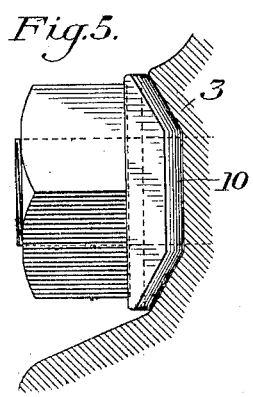
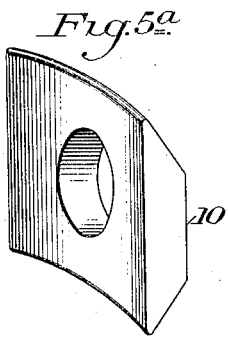
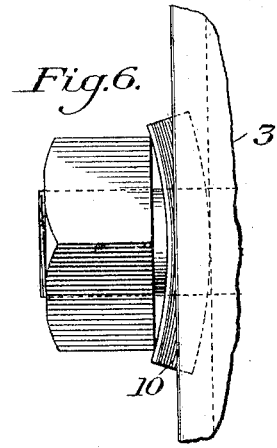
WITNESSES
R. A. Baldwson
W. Famaviss
INVENTORS
W. P. Thomson
S. G. Thomson
by Bakewell, Byrnes Parmelee
Attys.

W. P. & S. G. THOMSON.
RAIL JOINT.
APPLICATION FILED FEB. 17, 1911.
1,016,797.
Patented Feb. 6, 1912.
2 SHEETS—SHEET 2.
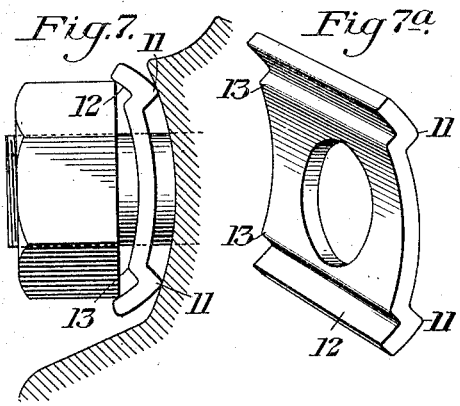
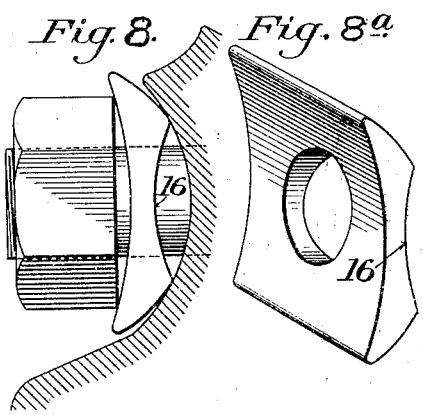

UNITED STATES PATENT OFFICE.

WILLIAM P. THOMSON AND SAMUEL G. THOMSON, OF PHILADELPHIA, PENNSYLVANIA, ASSIGNORS TO THOMSON-THOMSON COMPANY, OF PHILADELPHIA, PENNSYLVANIA, A PARTNERSHIP.

RAIL-JOINT.

1,016,797.  Specification of Letters Patent.  Patented Feb. 6, 1912.

Application filed February 17, 1911. Serial No. 609,231.

*To all whom it may concern:*

Be it known that we, WILLIAM P. THOMSON and SAMUEL G. THOMSON, residents of Philadelphia, in the county of Philadelphia and State of Pennsylvania, have invented a new and useful Improvement in Rail-Joints, of which the following is a full, clear, and exact description, reference being had to the accompanying drawings, forming part of this specification, in which—

Figures 1, 2, 3, 4, 5, 7, and 8 are sectional side views, showing different forms of our invention; Figs. $1^a$, $2^a$, $3^a$, $4^a$, $5^a$, $7^a$, and $8^a$ are perspective views of the plates or washers shown, respectively, of Figs. 1, 2, 3, 4, 5, 7, and 8. Fig. 6 is a top plan view of Fig. 5.

Our invention has relation to rail joints, and is designed to provide means of novel character for preventing the ordinary forms of nuts used on the joint bolts from turning and also for preventing the washer from being clamped tightly on the splice bar in any other than a substantially vertical position; and the invention consists in a spring washer of novel form which not only has a large and effective resistance, but which applies its force on the corners of the inner faces of the nut, where there is a maximum leverage to prevent the nut from rotating and which is also adapted to engage opposite corners of the nut before it can be clamped tightly on a splice bar.

Our invention also provides a nut-locking washer which is adaptable for various other purposes, as well as for use in rail joints for effectively locking a nut against rotation.

In the accompanying drawings, we have shown several different embodiments of our invention, but it will be understood that the invention is susceptible of various other embodiments within the spirit and scope of the appended claims.

In Fig. 1, the numeral 2 designates a portion of an ordinary track rail. 3 is a splice bar of general I-beam form, with its head and foot portions provided with the outer bevel faces 4 and 5 for contact with the nut-locking plate or washer 6. 7 is the nut. In the form shown in Figs. 1 and $1^a$, the plate or washer 6 is of rectangular form having a concave face toward the nut and a convex face toward the splice bar, the axis of curvature being horizontal, and the convex face having at its upper and lower edge portions the flat bevel surfaces 8, for contact with the bevel faces 4 and 5 of the splice bar when the plate or washer is flattened by the screwing home of the nut 7, as indicated in dotted lines in Fig. 1.

The form of washer shown in Figs. 2 and $2^a$ is similar to that shown in Figs. 1 and $1^a$, except that the bearing surfaces $8^a$, instead of being flat, are of convex form.

The form of washer shown in Figs. 3 and $3^a$ is similar to those shown in the preceding figures, except that the inner bearing faces $8^b$ are straight, instead of being beveled or curved.

Figs. 4 and $4^a$ show a form of washer 9, which is similar to that shown in Figs. 1 and $1^a$, except that the axis of curvature is vertical instead of horizontal.

In the form shown in Figs. 5 and $5^a$, the axis of curvature is vertical as in Figs. 4 and $4^a$, and the inner face 10 of the washer instead of being curved intermediate the inclined bearing faces, is flat, so as to bear against the web portion of the splice bar, as well as against the head and foot thereof. In the forms previously described, the washer does not bear against the web portion of the splice bar, but the only bearings are at the head and foot.

Figs. 7 and $7^a$ show a plate or washer having a horizontal axis of curvature with inward transverse projections 11, at its upper and lower portions formed by bending or stamping the metal. This bending of the metal forms inclined outer faces 12, which are engaged by the corners of the nut only when the nut is first brought into contact therewith. As the nut is drawn up and tends to flatten out the washer, the secondary bends or ridges 13 will engage the inner face of the nut.

Figs. 8 and $8^a$ show a plate or washer with a horizontal axis of curvature, and which is similar in its general features and action to the form shown in Figs. 2 and $2^a$, except that it is concave on its splice bar side, as indicated at 16, as well as on its nut side.

It will be noted that the plates not only form locking washers for the nuts, but they also act as bridge plates to transmit the pull of the nuts to the head and foot portions of the splice bar in lines approximately parallel to the axes of the joint bolts. In all the forms shown, it is characteristic of these bridge plates or washers that in their tightened position, they are prevented from rotating around the bolt by one or more projections which extend outwardly from the upright portion of the splice bar to a substantial distance outside of the innermost portion of the washer. This non-rotative feature assures maximum efficiency to prevent the nut from turning, by reason of gripping it at its corners, instead of adjacent to the bolt hole. Furthermore, the gripping action of the nut is automatic and does not involve the lipping or bending up of any portion of the bridge plate or washer to engage the wrench-seating faces of the nut, after the nut has been turned into its tightest position. The invention also obviates the use of a nut having an inner face of special conformation to receive projections from the nut lock or to engage recesses or openings in the nut lock, and thereby permits the use of the ordinary forms of nuts.

We are aware that previous efforts have been made to lock a nut by engaging it by a spring washer having a concave face toward the nut; but in the previous devices of which we are aware, there is present a serious defect that, while they seek to increase resistance by securing a grip at the corners of the inner face of the nut by concaving the nut side of the washer, the opposite side of the washer is decreased in frictional efficiency by making it convex with reference to the face on which it bears. Therefore, the resistance to rotation is no greater than if the concave side were toward the nut and the convex side were toward the face on which the washer bears. Another serious defect present in many previous devices is that it is necessary to engage them in some way with one or more of the wrench-gripping faces of the nut, and they are objectionable because they introduce the necessity for a mechanical operation which is secondary to that of screwing up the nut and which is, therefore, likely to be forgotten or if not forgotten is destructive or detrimental to the washer.

Our invention makes effective an increased resistance to rotation of the nut and also involves no other mechanical operation than the usual one of screwing the nut up tight against the washer.

We claim:

1. In a rail joint, a spring washer having a concave outer face and a bearing extending along the upper edge of its inner face, said bearing contacting with the splice bar above the bolt holes in a plane lying at an angle to the vertical.

2. In a rail joint, a spring washer having a concave face on its nut side and having a bearing face extending along its opposite side for the full width of the washer, adjacent to its upper edge, said bearing face engaging a slanting outer face of the splice bar.

3. In a rail joint, a spring washer having a concave face on its nut side and having a bearing face extending along the edge of its opposite side for the full width of the washer, said bearing face to fit within a longitudinally channeled outer face of a splice bar.

4. In a rail joint, a spring washer having a concave face on its nut side and having a fulcrum bearing extending horizontally along its opposite side and lying between the center of the bolt and one of the horizontal edges of the washer.

5. In a rail joint, a spring washer having a concave face on its nut side, said face being adapted to flatten out when the washer is clamped tightly between the nut and two longitudinally extending bearings lying adjacent to its upper and lower edges.

6. In a rail joint, a spring washer having separate fulcrum bearings extending horizontally along its inner face and fitting a splice bar above and below a horizontal plane through the center of the bolt holes, said washer also having a concave outer face to engage the nut.

7. In a rail joint, a splice bar, a clamping bolt and nut, and a spring washer having a concave outer face and separate horizontally extending fulcrum bearings against the splice bar above and below the center of the bolt.

8. In a rail joint, a spring washer having a concave face on its nut side, and having separate bearings extending longitudinally along its opposite side parallel to its axis of curvature to engage the splice bar above and below the bolt holes.

9. In a rail joint, a spring washer having a concave face on its nut side the axis of curvature of said face being horizontal, said washer bearing against the splice bar adjacent to the upper and lower edges of the washer and standing free from the bar between said bearings.

10. A spring washer which is concave on its nut side, said washer having a greater sectional thickness in planes parallel to the axis of curvature and adjacent to its upper and lower edges than it has along a plane through its middle parallel to said edges.

11. A spring washer having a concave face on its nut side and a bolt hole therethrough, said washer having a greater sectional thickness in a plane parallel to its axis of curvature lying between the edge of said hole and an adjacent edge of the washer, than it has in a parallel plane intersecting the bolt hole.

12. A spring washer having a concave face on its nut side, said washer having a substantially thin central portion with a hole therethrough, said thin portion being located between two thicker portions extending along the opposite edges of the washer parallel to its axis of curvature.

13. In a rail joint, a spring washer having a concave outer face and having on its inner face bearing ribs extending along its opposite edges to engage the splice bar.

14. A spring washer having a concave face on its nut side, said washer having separate inner bearing faces extending along the opposite edges of the washer and parallel to its axis of curvature.

15. A spring washer having a concave outer face and having bearing ribs extending across its inner face adjacent to its opposite edges and in the same direction as the axis of curvature of said outer face.

In testimony whereof, we have hereunto set our hands.

WILLIAM P. THOMSON.
SAMUEL G. THOMSON.

Witnesses:
McLEOD THOMSON,
MORRIS L. KOLB.